(12) United States Patent
Emiliano et al.

(10) Patent No.: US 9,586,294 B2
(45) Date of Patent: Mar. 7, 2017

(54) QUICK POSITIONING ORBITAL WELDING DEVICE

(71) Applicant: ILLINOIS TOOL WORKS INC., Glenview, IL (US)

(72) Inventors: Rubini Emiliano, Rome (IT); Raimondo Massimiliano, Rome (IT)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 14/778,184

(22) PCT Filed: Mar. 17, 2014

(86) PCT No.: PCT/US2014/030159
§ 371 (c)(1),
(2) Date: Sep. 18, 2015

(87) PCT Pub. No.: WO2014/160535
PCT Pub. Date: Oct. 2, 2014

(65) Prior Publication Data
US 2016/0271741 A1    Sep. 22, 2016

(30) Foreign Application Priority Data
Mar. 26, 2013    (IT) .............................. TO2013A0248

(51) Int. Cl.
*B23K 37/00* (2006.01)
*B23K 37/02* (2006.01)
(Continued)

(52) U.S. Cl.
CPC ........ *B23K 37/0276* (2013.01); *B23K 9/0282* (2013.01); *B23K 37/0258* (2013.01); *B23K 37/0533* (2013.01)

(58) Field of Classification Search
CPC ... B23K 9/028–9/0288; B23K 37/0538; B23K 37/0276; B23K 37/0533;
(Continued)

(56) References Cited

U.S. PATENT DOCUMENTS 3,395,263 A * 7/1968 Kazlauskas .......... B23K 9/0284
219/125.11
3,688,072 A * 8/1972 Witt ..................... B23K 9/0282
219/158
(Continued)

FOREIGN PATENT DOCUMENTS

EP         1160043 A1    12/2001
WO    2006071622 A1     7/2006

OTHER PUBLICATIONS

ISR and WO for PCT/US2014/030159 mailed Sep. 23, 2014.

*Primary Examiner* — Kiley Stoner
(74) *Attorney, Agent, or Firm* — Hauptman Ham, LLP

(57) ABSTRACT

Orbital welding device including a body, a welding head carried by one end of the body, and a device for holding the body on a tubular element to be welded, including: cantilever portions of the end of the body, which project in an overhanging manner transversely to a rotation axis of the welding head and beyond the rotation axis; a plurality of through holes formed through the cantilever portions transversally to these portions and to the rotation axis, positioned axially to the side of the welding head; a plurality of pneumatic devices accommodated in the through holes so that each device can selectively extract and lock in an extracted position toward the rotation axis a respective pin adapted to interact with the element to be welded; a pair of manifolds fixed in a laterally removable manner on the outside of the cantilever portions and in hydraulic communication with the through holes and compressed air supply (Continued)

conduits connected to a control box provided with an electrovalve controlled by a manually operated switch.

10 Claims, 4 Drawing Sheets

(51) Int. Cl.
*B23K 9/028* (2006.01)
*B23K 37/053* (2006.01)

(58) Field of Classification Search
CPC .. B23K 37/0258; B23K 26/28; B23K 26/282; B23K 2201/06–2201/10
USPC ................... 228/44.5, 49.3, 29; 219/59.1–67
See application file for complete search history.

(56) References Cited

U.S. PATENT DOCUMENTS

| | | | |
|---|---|---|---|
| 6,121,567 A * | 9/2000 | Guerrina | B23K 11/066 219/125.11 |
| 6,948,648 B2 * | 9/2005 | Armstrong | B05B 15/069 219/61 |
| 2005/0011928 A1 | 1/2005 | Dick | |
| 2005/0247754 A1 * | 11/2005 | Butler | B23K 37/0533 228/44.5 |
| 2007/0289954 A1 * | 12/2007 | Bien | B23K 9/0282 219/121.46 |
| 2008/0061487 A1 * | 3/2008 | Falk | B23K 37/0533 269/52 |
| 2010/0301103 A1 * | 12/2010 | Bonelli | B23K 9/0216 228/227 |
| 2011/0049105 A1 * | 3/2011 | Dupont | B23K 9/0286 219/59.1 |
| 2011/0186615 A1 * | 8/2011 | Gatlin | B23K 9/121 228/102 |
| 2011/0316271 A1 * | 12/2011 | Lalam | B23K 9/0282 285/179 |
| 2012/0074631 A1 * | 3/2012 | Dagenais | B23K 37/0217 269/37 |
| 2013/0306612 A1 * | 11/2013 | Snead | B23K 9/0286 219/138 |
| 2014/0034714 A1 * | 2/2014 | Gatlin | B23K 9/0286 228/212 |
| 2014/0259597 A1 * | 9/2014 | Lavalley | B21D 19/10 29/407.1 |
| 2015/0060436 A1 * | 3/2015 | Kocks | B23K 9/0286 219/60 A |
| 2015/0298238 A1 * | 10/2015 | Van Rensburg | B23K 9/0017 219/137.31 |
| 2015/0343507 A1 * | 12/2015 | Deley, Jr. | B21C 37/0822 219/61.3 |

* cited by examiner

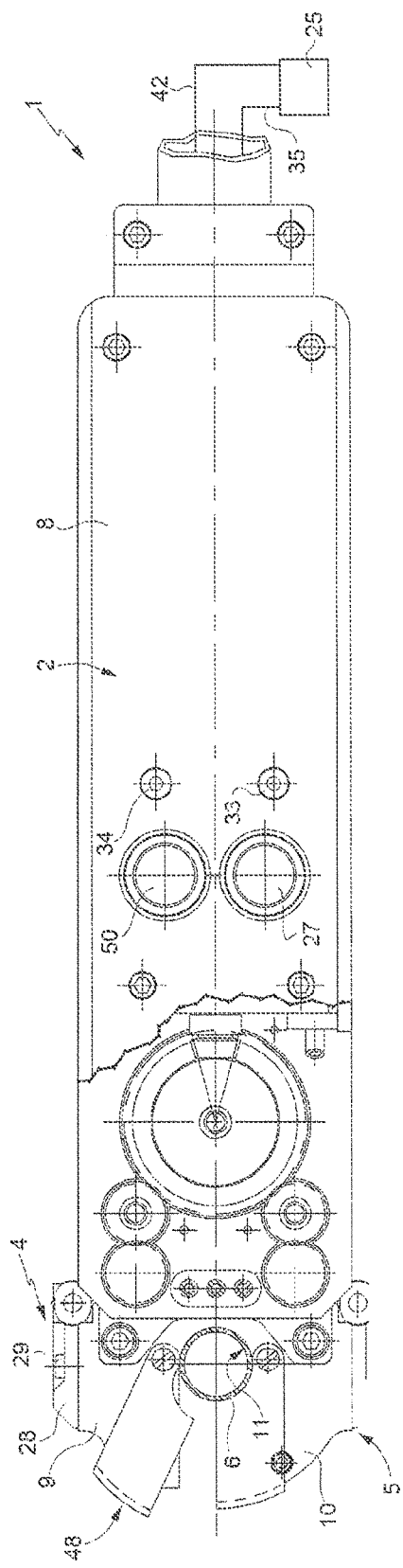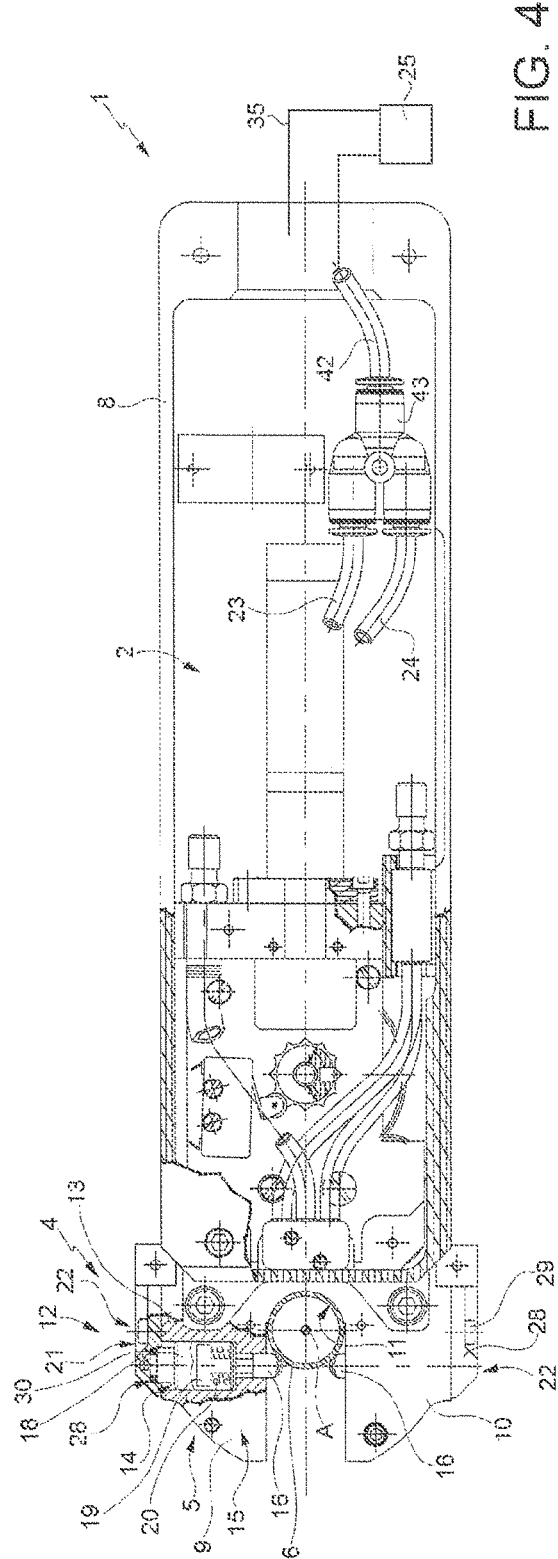

QUICK POSITIONING ORBITAL WELDING DEVICE

RELATED APPLICATIONS

The present application is a National Phase of International Application Number PCT/US2014/030159 filed Mar. 17, 2014 and claims priority to Italian Application Number TO2013A000248 filed Mar. 26, 2013.

The present invention relates to an orbital welding device, which an operator can position quickly and in an extremely efficient manner on tubular elements to be welded.

It is known that, particularly in the technical field of heat exchangers, the change from the use of copper tubes to the use of stainless steel tubes has made the welding operations much more complicated and difficult, because of the continual reduction of the dimensions of exchangers and tube diameters. In order to weld the terminal connections of the tubes of a tube sheet, called "hairpins" because they are formed by U-shaped tube portions, to the tubes of the tube sheet, use is made of an orbital welding device composed of a body which supports at one end a welding head rotating about an axis; an operator has to grasp the body of the device and position the welding head coaxially with the tubular element to be welded, and then, before starting the welding, fix (clamp) the body to the tubular element to be welded, so as to maintain the correct position during welding.

The temporary fixing of the body of the welding device to the tubular element is carried out at present by means of spring-loaded mechanical grip systems, composed of pins which are normally held by springs in a position in which they are extended from a blind socket located on the body of the device, near the welding head. In order to fix the device, the operator must first manually retract the pins, against the action of the springs, and then allow them to return to the extended position. In order to increase the rigidity of this type of hold, two dowels are inserted, which, when the positioning is completed, lock two of the four pins, in this case the two pins on the hairpin side.

The operator then has to fit the device onto the element to be welded, allow the pins to grip the element, and then make the hold rigid by tightening the two dowels which lock the axial movement of the aforesaid two pins.

These operations require a certain amount of time and attention, increasing the cycle time required for each weld, and also require the operator to put his hands among the hairpins, making the operation complicated and difficult because of the limited available space. It is also possible that the operator may suffer an accident.

One object of the present invention is to overcome the drawbacks of the prior art by providing an orbital welding device which can be correctly positioned and fixed by the operator in the welding position in a simple and quick way without any need for him to place his hands among the hairpins.

The present invention therefore relates to an orbital welding device as defined in Claim 1.

The device according to the invention comprises an internally hollow body, an orbital welding head carried by the hollow body at a first of its ends, and a holding and centering device adapted, in use, to hold the body onto, and center the head on, a tubular element to be welded. The holding and centering device comprises, in turn, a first and a second cantilever portion of the first end of the hollow body, opposite to each other, which project in an overhanging manner from the hollow body transversely to a rotation axis of the welding head and beyond the rotation axis, and which delimit between them and at the welding head a concave seat adapted to receive, in use, a tubular element to be welded positioned coaxially with the welding head; and gripping means carried in reciprocally facing positions by corresponding sections of the first and second cantilever portions, these sections projecting from the side opposite the hollow body beyond the rotation axis of the welding head, so that the gripping means are adapted to interact, in use, with a tubular element to be welded, in positions diametrically opposite said concave seat.

According to the principal aspect of the invention, the gripping means comprise a plurality of through holes formed through the first and second cantilever portions, transversely to the rotation axis of the welding head and in the sections of the cantilever portions which project on the opposite side to the hollow body, beyond the rotation axis of the welding head; and, for each through hole, a pneumatic device accommodated in the hole and comprising a pin selectively extendable from, and retractable into, the hole on the side of the rotation axis of the welding head, the pin being adapted, in use, to interact at least partially by bearing against a tubular element to be welded; in combination, the holding and centering device further comprises: at least one pair of manifolds carried by the first and second cantilever portions so as to be in hydraulic communication with the interior of the through perforations holes for supplying the pneumatic devices, which are fluid-tightly accommodated in the through holes; respective conduits for supplying compressed air to the manifolds, which are at least partially integrally carried by the hollow body outside and/or inside the same; and a control box separate from the hollow body and provided with an electrovalve controlled by a first manually operated switch and adapted to selectively supply pressurized fluid to the manifolds, through the conduits, for extending the pins and locking them in the extended position.

The manifolds are defined by internally hollow profiled elements which extend lengthwise parallel to the rotation axis of the welding head and which are removably fixed laterally on the exterior of the cantilever portions, on opposite side to the welding head, so as to cover respective first ends of the through holes opposite to the welding head, for fluid-tightly closing the through holes on the side opposite to the welding head; the conduits are also fluid-tightly connected to the manifolds at respective first axial ends of the profiled elements.

Thus the operator simply has to position the end of the body of the device, provided with the welding head and the cantilever portions, near the tubular element to be welded. Then, when the switch is actuated, pressurized fluid is supplied to the pneumatic devices, moving the pins to the extended position and locking them there, whereupon, because of the appropriate positioning of the through holes accommodating the pneumatic devices, which may be simple commercially available pneumatic actuators, the pins interact with the tubular element, centering the welding head, and then keep the body clamped onto the tubular element to be welded, incidentally with the use of a much greater force than that exerted by the springs of the known devices.

On completion of the welding operation, the operator again actuates the switch to shut off the supply of compressed air to the pneumatic devices by closing the electrovalve. The pins are therefore made to return completely into the holes which form the seats of the pneumatic devices within the devices, into a retracted position, for example by means of internal springs of the pneumatic devices.

To facilitate the operator's work, the device according to the invention is also provided externally, on the hollow body, with a first and a second LED, and comprises a control unit (programmer) which is separate from both the hollow body and the control box. The activation of the electrovalve, resulting in the supply of compressed fluid and the locking of the pins in the extended position, turns on the first LED. The second LED is turned on throughout the execution of the welding cycle by the welding head, as a result of the actuation of a first switch dedicated to this function. On completion of the welding, the second LED is turned off and the operator can actuate a second switch to release the device. When the device is released (with the pins in the retracted position), the first LED is also turned off and the operator can remove the device in order to proceed with welding the next element.

All these operations take place without the need for the operator to put his hands among the hairpins, and in an extremely simple and quick way, thus drastically reducing the welding cycle time and holding the element in a highly rigid way which ensures the correct positioning of the ends to be welded.

Further characteristics and advantages of the present invention will be made clear by the following description of a preferred embodiment thereof, provided purely by way of non-limiting example, with reference to the attached drawings, in which:

FIGS. 3 and 4 show schematically two plan views from above, in partial section in the case of FIG. 4, of the device of FIG. 2.

Figure 1:
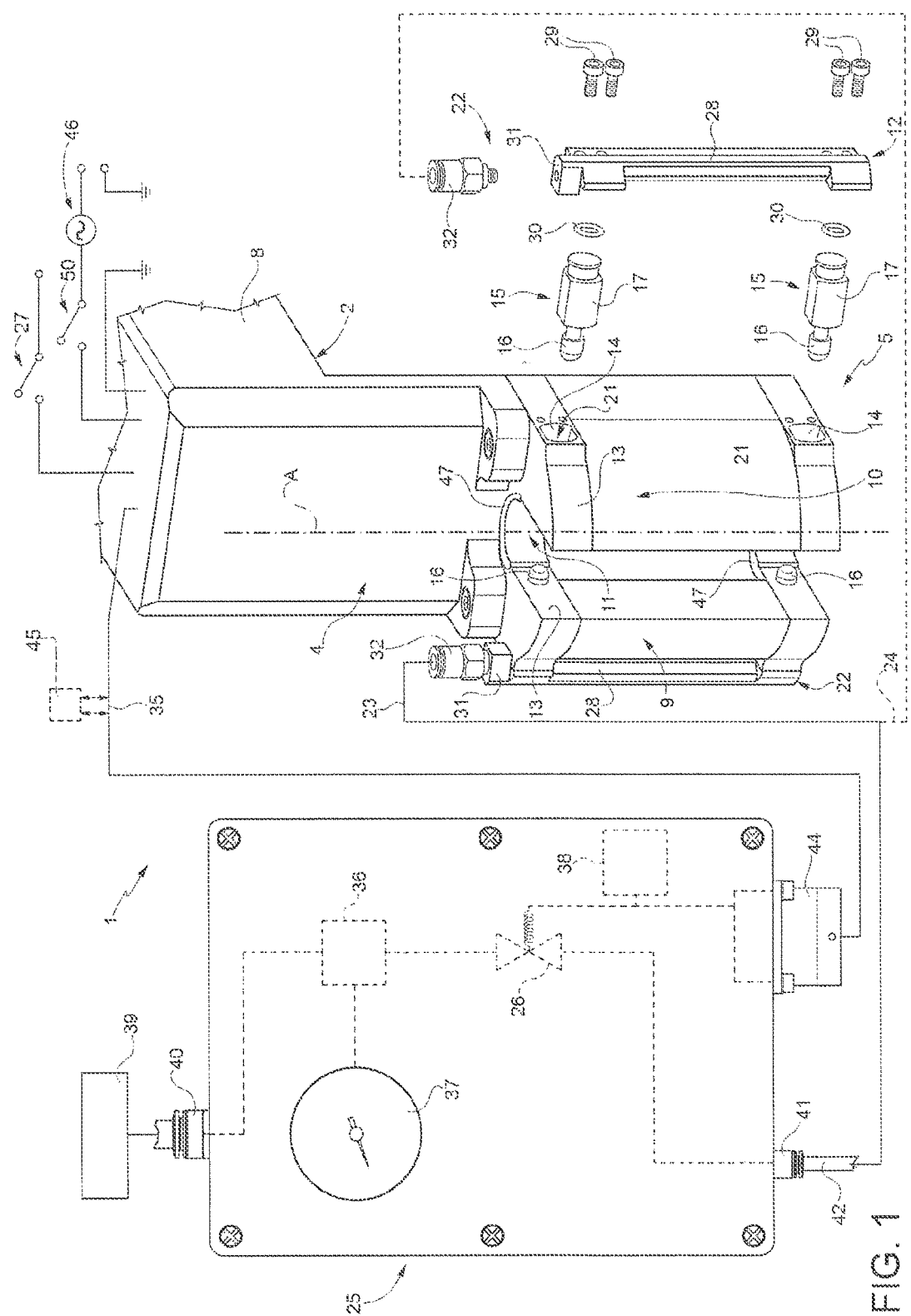
FIG. 1 shows a partially exploded schematic view of an orbital welding device made according to the invention.

With reference to FIGS. 1 to 5, the number 1 indicates the whole of an orbital welding device comprising an internally hollow body 2, an orbital welding head 3, which is known (FIG. 2) and is therefore not illustrated or described in detail, carried by the hollow body 2 at a first of its ends 4, and a holding and centering device t adapted, in use, to hold the body 2 onto, and center the head 3 on, a tubular element 6 to be welded.

In the non-limiting example illustrated, the element 6 is one of a plurality of hairpins 6 of a tube sheet 7, among which the device 1 is to be inserted in order to carry out the welding of all the hairpins 6, one at a time, the hairpins being placed in positions close together and being formed by lengths of tube bent into a U-shape.

For this purpose, the hollow body 2 is L-shaped, and its first end 4 is formed by a first branch of the L placed parallel to a rotation axis A of the welding head 3, coinciding in use with the axis of symmetry of the length of tubular element or hairpin 6 to be welded (FIG. 2); a second end 8 of the hollow body 2, opposite the end 4, is formed by a second branch of the L, placed perpendicularly to the axis A; in the illustrated example, the body 2 has a substantially prismatic (rectangular) cross section, and the branch or end 4 has a flattened profile by comparison with that of the branch or end 8.

The holding and centering device 5 comprises at least a first cantilever portion 9 and a second cantilever portion 10 of the first end 4 of the hollow body 2, opposed to each other and projecting in an overhanging manner from the hollow body 2 transversely to the rotation axis A of the welding head 3 and beyond this axis A; in practice, the cantilever portions 9 and 10, which may be of any shape and which, in the illustrated example, combine to form a fork-like element, extend in an overhanging manner from the rest of the end 4 parallel to the end or branch 8 of the hollow body 2, but at the opposite end from a longitudinal extension of the end or branch 8.

The cantilever portions 9 and 10 also delimit between them and at the position of the welding head 3, which they support in a known manner, a concave seat 11 adapted to receive, in use, a tubular element 6 to be welded, placed coaxially with the welding head 3;

The holding and centering device 5 also comprises gripping means, indicated as a whole by 12 (FIGS. 1 and 4), carried in reciprocally facing positions by corresponding sections 13 of the first and second cantilever portions 9 and 10, these sections 13 projecting from the side opposite the hollow body 2, and therefore from the side opposite its end 8, beyond the rotation axis A of the welding head 3, so that the gripping means 12 are adapted to interact, in use, with a tubular element 6 to be welded, in positions diametrically opposite the concave seat 11 (FIG. 4).

Figure 2:
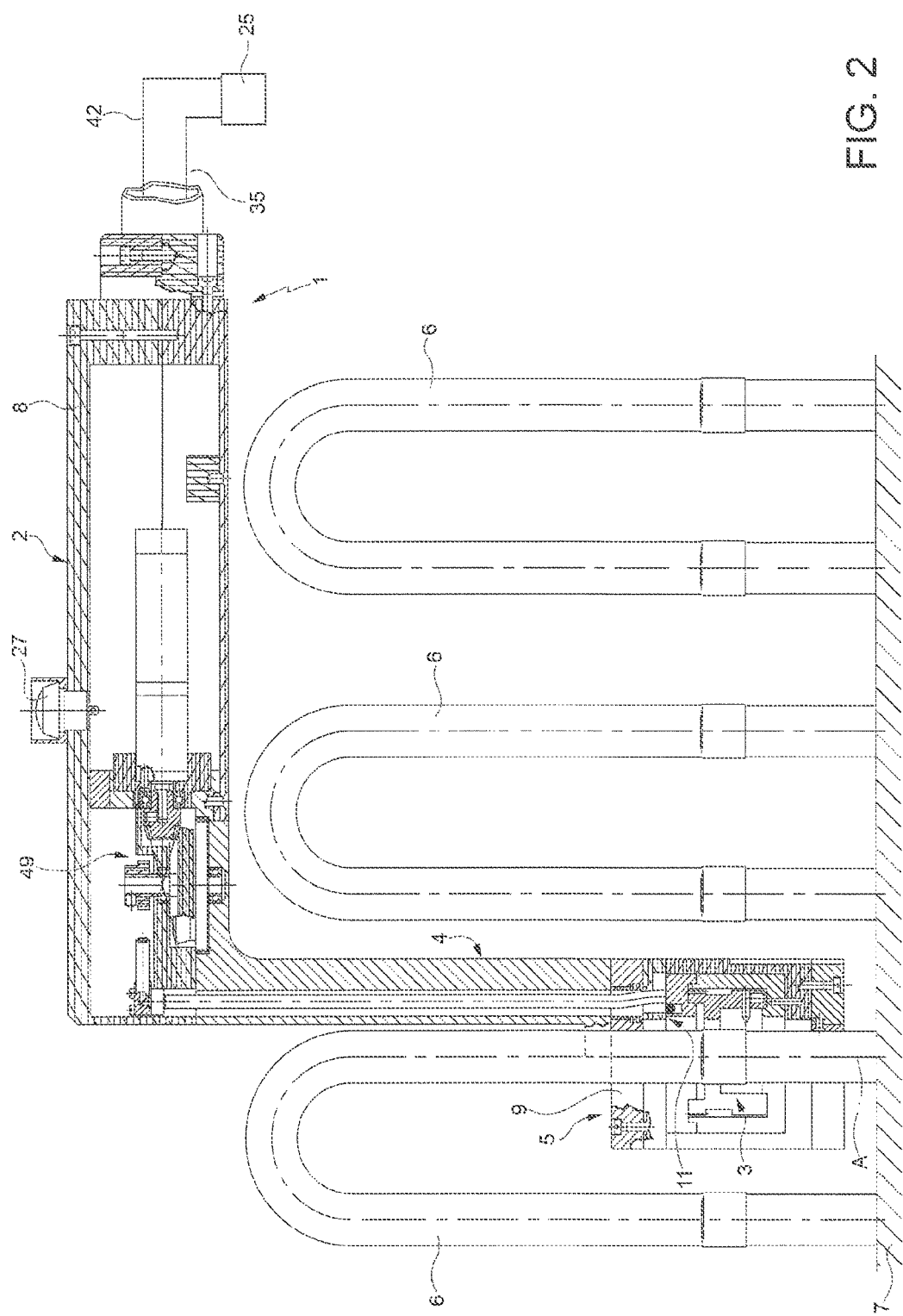
FIG. 2 is a schematic view in elevation of a longitudinal section through the device of FIG. 1, in a configuration of use.
Figure 5:
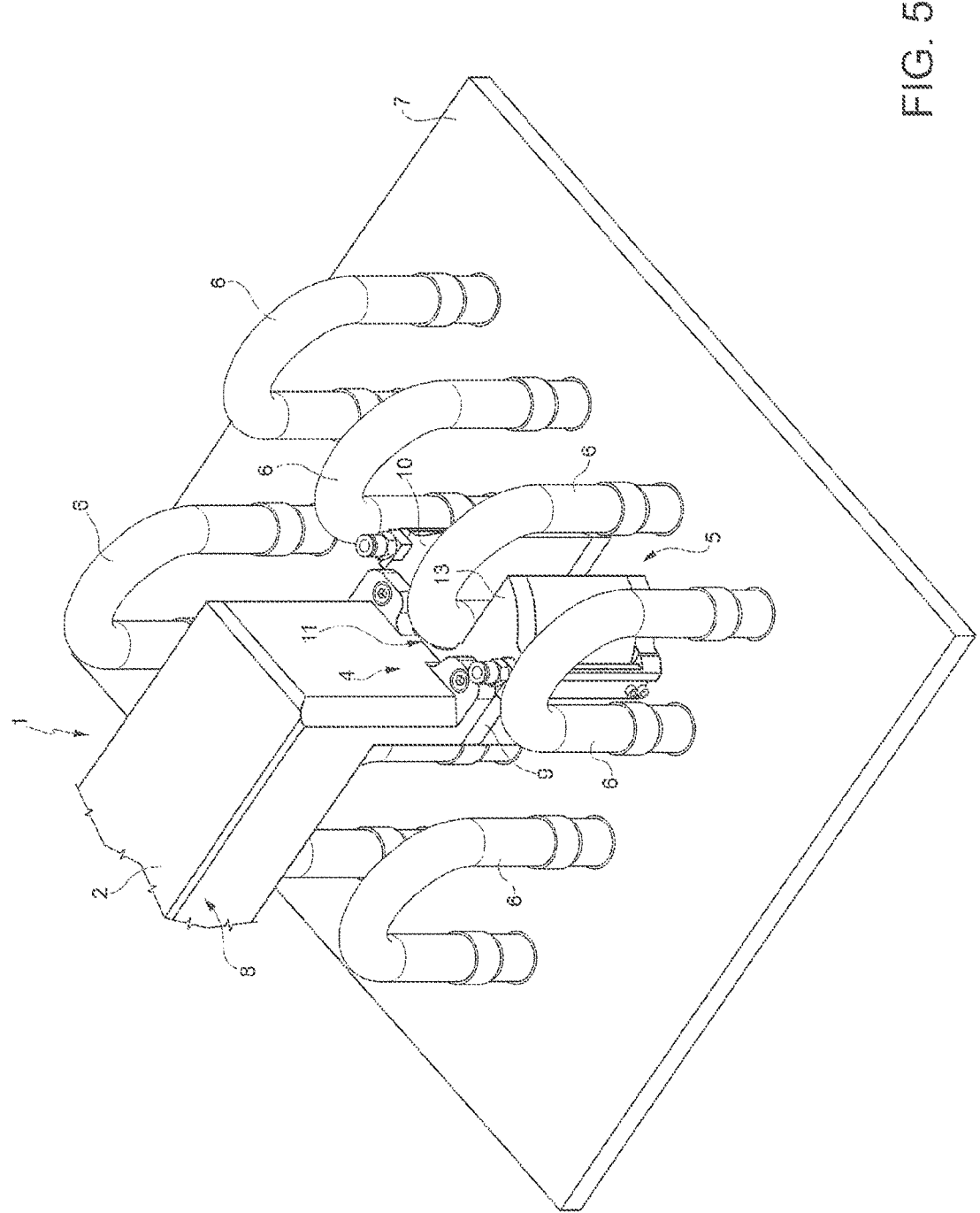
FIG. 5 shows in a perspective view the device according to the invention in the same situation and configuration of use as in FIG. 2, the device being shown only in part for the sake of simplicity.

In the illustrated example, the cantilever portions 9 and 10 extend, in a direction parallel to the rotation axis A of the welding head 3, over a length greater than the axial extension of the welding head 3, so that, according to one aspect of the invention, the gripping means 12 carried by the sections 13 are placed, in the aforesaid direction parallel to the axis A, beside the welding head 3 and on both sides thereof, for example, with reference to FIGS. 2 and 5, where the axis A is vertical, both above and below the welding head 3. Evidently, the same result can be obtained by providing, for example, instead of only two cantilever portions 9 and 10 having a suitable length in the direction of the axis A, four cantilever portions similar to the portions 9 and 10 and placed in pairs on both sides of the welding head 3, both along the direction parallel to the axis A and in a direction transverse to the axis A and also to the longitudinal direction of extension of the end 8.

According to the principal aspect of the invention, in combination with what is described above, the gripping means 10 comprise a plurality of through holes 14 passing through the first and second cantilever portions 9 and 10, transversely to the rotation axis A of the welding head 3 and at the position of the sections 13 of the cantilever portions 9, 10 that project at the opposite end from the hollow body 2 and the end or branch 8 thereof, beyond the rotation axis A of the welding head 3.

For each through hole 14, the gripping means 10 further comprise a pneumatic device 15 housed in the hole 14 and comprising a pin 16 which is selectively extendable from and rectractable into the hole 14 on the side of the rotation axis A of the welding head 3.

Each pin 16, which, in the non-limiting example illustrated, is rounded with a spherical shape at its end facing the axis A, is adapted, in use, to interact, in an extended position as shown in FIG. 4, at least partially by bearing against a tubular element 6 to be welded, in a position diametrically opposite the seat 11. The pneumatic devices 15 may be made specially for use with the device 1, or may be simple linear pneumatic actuators of a commercially available type. In all cases, each pneumatic device 15 comprises (FIGS. 1 and 4) a body 17, within which is formed a chamber 18, in which a piston 19, fixed integrally to the respective pin 16, slides. The chamber 18 is open on the side opposite the pin 16, which passes slidingly through the body 17 toward the axis A; on the side of the pin 16, a spring 20 is mounted in the chamber 17, this spring opposing the sliding motion of the piston 19 and normally keeping the pin 16 in a retracted position within the hole 14, in which retracted position the pin 16 either lies flush with the end of the respective hole 14 facing the axis A or projects therefrom by a small amount toward the axis A, this amount not being sufficient to cause the pin 16 to interfere with the element 6 to be welded.

The devices 15 are mounted within the through holes 14 with the open end of the chamber 18 facing an end 21 of the respective through hole 14 which faces in the opposite direction from the axis A; as is clearly visible in FIG. 4, the ends 21 of the through holes 14 each have a larger cross section than the opposite ends of the holes 14, which face toward the axis A and through which the respective pins 16 pass slidingly, the shapes and sizes of the ends of the holes 14 facing the axis A being complementary to the pins.

In combination with what has been described above, the holding and centering device 5 further comprises at least a pair of manifolds 22 carried by the cantilever portions 9, 10 so as to be in hydraulic communication with the interior of the through holes 14 for supplying the pneumatic devices 15, which are housed fluid-tightly in the through holes 14; the device 5 further comprises respective conduits 23 and for supplying pressurized fluid to the manifolds 22, these conduits being at least partially integrally carried by the hollow body 2 on the outside and/or the inside of this body, as is clearly shown in FIG. 4.

Finally, the holding and centering device 5 comprises a control box 25 separate from the hollow body 2 and provided with an electrovalve 26 controlled by a manually actuated switch 27 (FIG. 1).

The electrovalve 26 is adapted to supply compressed air selectively to the manifolds 22 through the conduits 23, 24 so as to cause the pins 16, in use, to be extended and locked in the extended position (FIG. 4).

The manifolds 22 are preferably formed by internally hollow profiled elements 28 which extend lengthwise parallel to the rotation axis A of the welding head 3 and which are removably fixed laterally on the exterior of the cantilever portions 9, 10, on the opposite side from the welding head, so as to cover the ends 21 of the through holes 14 in order to close the holes 14 fluid-tightly on the opposite side from the welding head 3.

In particular, the profiled elements 28 are fixed integrally to the end 4 of the body 2, on the outer sides of the cantilever portions 9, 10 in the present case, by means of screws 29, and sealing rings 30 in the form of O-rings are interposed between the profiled elements 28 and the ends 21 of the holes 14, that is to say the ends of the bodies 17 toward which the chambers 18 are open.

The conduits 23, 24 are connected fluid-tightly to the manifolds 22 at respective first axial ends 31 of the profiled elements 28 facing toward the end or branch 8 of the body 2, for example by means of quick-release connectors 32.

The manually actuated switch 27, which is shown in plan view in FIG. 3 and shown in side view in FIG. 2, is carried, preferably integrally, by the hollow body 2, particularly on the upper side (that is to say, on the opposite side to the end 4) of the branch or end 8, together with a first LED 33 and a second LED 34 for signaling, and a second manually actuated switch 50; the hollow body 2 is also connected flexibly and/or pivotably to the control box 25 through the conduits 23, 24 and at least one respective multicore cable 35.

The electrovalve 26 is housed within the control box 25 together with a pressure regulator 36 having a pressure gauge 37 and at least one electrical control element 38, indicated schematically as a block in broken lines in FIG. 1.

The pressure regulator 36 is adapted to supply pressurized fluid to the conduits 23, 24 at a controlled pressure which never exceeds 8 bar, the pressurized fluid being taken from a source 39 of a known type, and is connected hydraulically in series with the electrovalve 26, being interposed between this valve and a first external hydraulic connection 40 of the control box 25, through which external hydraulic connection 40 the pressure regulator 36 can be connected, in use, to the pressurized fluid source 39.

The electrovalve 26 is connected electrically and/or mechanically to the electrical control element 38 in a known way, and is connected hydraulically in series, downstream of the pressure regulator 36, to a second external hydraulic connection 41 of the control box 25, connected hydraulically to the conduits 23 and 24. In particular, a flexible tube 42 runs from the external connection 41, and terminates in a Y connector 43 which in turn is connected to the conduits 23 and 24 (FIG. 4) and is carried integrally by the body 2, outside or inside the latter.

In turn, the electrical control element 38 is electrically connected to a third external connection or multipole electrical connector 44 of the control box 25, which is electrically connected to the switches 27 and 50 via the multicore cable 35, which is flexible.

The control box 25 is therefore connected flexibly to the hollow body 2 by the tube 42, which subsequently splits into the conduits 23, 24, and by the electrical cable 35.

The device 1 is also adapted to interact with a programming controller or CPU 45, particularly for controlling the welding head 3 and the welding cycle; this controller and the switches 27 and 50 are connected to an electrical power source 46 (FIGS. 2 and 3) in a way which will be evident to those skilled in the art, and which is therefore not illustrated in detail, for the sake of simplicity.

The switch 27, when actuated, is adapted to cause the electrovalve 26 to open until the pins 16 are locked in the extended position, and the actuation of the welding head 3 is then caused according to a cycle previously programmed by means of the controller 45, when the switch 50 is actuated (FIGS. 1 and 3); on completion of the programmed welding cycle, a further actuation of the switch 27 causes the electrovalve 26 to close, as a result of which the pins 16 are released and return to a retracted position in or toward the holes 14.

According to the programming provided by the controller 45, the first LED 33 is turned on when the pins 16 are locked in the extended position, while the second LED 34 is turned on when, after the actuation of the switch 50, the welding head 3 is actuated, and is turned off at the end of the welding cycle. The controller 45 (programmer/generator) is of considerable size and is connected to the other control devices of the device 1 that have been described (the switches 27 and 50) by means of the machine cable, which is known and is not illustrated for the sake of simplicity, but which in any case forms a separate element.

According to a further aspect of the invention, the concave seat 11, adapted to receive, in use, one tubular element 6 to be welded at a time, is formed by a pair of half-shells 47 housed removable between the opposed cantilever portions 9, 10 of the first end 4 of the hollow body 2, in such a way that the device 1 can be fitted with half-shells 47 having different radii in order to adapt it to elements 6 of different sizes to be welded. The half-shells 47 are placed at the position of gripping means 10, which in the illustrated example are formed by two pairs of pneumatic devices 15, which are placed opposite each other, and, in a direction parallel to the rotation axis A of the welding head 3, at the side of the welding head 3 (above and below the head 3 in FIG. 1).

Finally, the device 1 preferably comprises a scissor-shaped movable shield 48 (FIG. 3) carried by the hollow body 2 to create a closed chamber adapted to be filled with inert gas for the protection of the welding, the shield being carried by the end or branch 4 placed toward the end or branch 8 in the present case.

The welding head 3 is actuated in a known way, a description of which is therefore omitted for the sake of simplicity, using the switch 50 and the electrical power source 46, by means of a known motorized controller 49 (FIG. 2).

The invention claimed is:

1. Orbital welding device comprising an internally hollow body, an orbital welding head carried by the hollow body at a first end thereof, and a holding and centering device adapted in use to hold the body and to center the head on a tubular element to be welded; wherein the holding and centering device comprises: a first and a second cantilever portion of the first end of the hollow body, opposite to each other, which project in an overhanging manner from the hollow body transversally to a rotation axis of the welding head and beyond the rotation axis and which delimit therebetween and at the welding head a concave seat adapted to receive in use a tubular element to be welded arranged coaxially to the welding head; and gripping means carried in reciprocally facing positions by corresponding stretches of the first and second cantilever portions, which stretches project from the side opposite to the hollow body beyond the rotation axis of the welding head, so that the gripping means are adapted to cooperate in use with a tubular element to be welded in diametrically opposite positions with respect to said concave seat; characterized in that the gripping means comprise: a plurality of through perforations obtained through the first and second cantilever portions transversally to the rotation axis of the welding head and at said stretches of the cantilever portions which project on the opposite side with respect to the hollow body, beyond the rotation axis of the welding head; and, for each through perforation, a pneumatic device accommodated in the perforation and comprising a pin selectively extractable from, and retractable into, the perforation on the side of said rotation axis of the welding head, the pin being adapted in use to cooperate at least partially in abutment against a tubular element to be welded; in combination, the holding and centering device further comprising: at least one pair of manifolds carried by the first and second cantilever portions so as to be in hydraulic communication with the interior of said through perforations for feeding the pneumatic devices, which are fluid-tightly accommodated in the through perforations; respective conduits for feeding a fluid under pressure to the manifolds, which are at least partially integrally carried by the hollow body outside and/or inside the same; and a control box separate from the hollow body and provided with an electrovalve controlled by a first manually operated switch and adapted to selectively feed pressurized fluid to the manifolds, through said conduits, for extracting the pins and locking them in extracted position.

2. A device according to claim 1, wherein said manifolds are defined by internally hollow, profiled elements which extends lengthwise parallel to the rotation axis of the welding head and which are removably fixed laterally on the exterior of the cantilever portions, on opposite side with respect to the welding head, so as to cover respective first ends of the through perforations opposite to the welding head, for fluid-tightly closing said through perforations on the side opposite to the welding head; said conduits being fluid-tightly connected to the manifolds on the side of respective first axial ends of the profiled elements.

3. A device according to claim 2, wherein the hollow body is L-shaped, the first end of the hollow body being defined by a first wing of the L arranged parallel to the rotation axis of the welding head; the first axial ends of the profiled elements defining the manifolds being facing a second wing of the L, opposite to the first one and arranged perpendicular to the rotation axis of the welding head.

4. A device according to claim 1, wherein said first manually operated switch is integrally carried by the hollow body along with a first and a second signaling LED and a second manually operated switch; said hollow body being flexibly connected to said control box through said conduits and at least one respective electric cable.

5. A device according to claim 1, wherein said electrovalve is accommodated within the control box along with a pressure regulator and with at least one electric control element; the pressure regulator being hydraulically connected to the electrovalve, between the latter and a first outer connection of the control box, through which first outer connection the pressure regulator is connectable in use to a pressurized fluid source; the electrovalve being connected to the electric control element and to a second outer connection of the control box hydraulically connected to said conduits; and the electric control element being connected to a third outer connection of the control box.

6. A device according to claim 5, wherein the second and the third outer connections of the control box are connected to the hollow body through a flexible pipe which ends with a Y-joint in turn connected to said conduits and to an electric cable, respectively, which electric cable is electrically connected to said first manually operated switch.

7. A device according to claim 6, wherein it is apt to be connected with a CPU and with an electrical power source connected to said first manually operated switch, which is adapted, when it is operated, to firstly control the opening of the electrovalve up to obtaining the locking of the pins in extracted position, then the operation of a first LED integrally carried by the hollow body; a second manually operated switch integrally carried by the hollow body and connected with the electrical power source being adapted to control the operation of the welding head and then the operation of a second LED, up to completing a programmed welding cycle; the first switch being further adapted, upon a second operation thereof, to control the closing of the electrovalve with consequent unlock of the pins and their return to a retracted position into the perforations.

8. A device according to claim 7, wherein the second switch is adapted, when it is operated, to start the programmed welding cycle and to switch on a second signaling LED, which switches off at the end of the welding cycle.

9. A device according to claim 1, wherein said concave seat adapted to receive in use a tubular element to be welded is defined by a pair of half-shells removably accommodated between said opposite cantilever portions of the first end of the hollow body and at said gripping means, which are defined by two pairs of said pneumatic devices, which are arranged opposite and, in a direction parallel to the rotation axis of the welding head, on the side of the welding head.

10. A device according to claim 1, wherein it comprises a scissor-like mobile shield carried by the hollow body and adapted to create a closed chamber around the tubular element to be welded to form, in the vicinity of a junction to be welded, an inert atmosphere zone necessary to protect the welded joint during the whole welding operation.

* * * * *